United States Patent Office 3,123,595
Patented Mar. 3, 1964

3,123,595
REACTIVE DYESTUFFS
Hugo Brugger and Hermann Burkhard, Basel, Switzerland, assignors to Sandoz Ltd. (also known as Sandoz A.G.), Basel, Switzerland
No Drawing. Filed Apr. 12, 1960, Ser. No. 21,620
Claims priority, application Switzerland Apr. 17, 1959
11 Claims. (Cl. 260—151)

This invention relates to reactive dyestuffs which contain at least one 2.3-dihalogenopropyl group as reactive substituent. The process for their preparation consists in treating with halogen or a halogen-yielding agent, organic dyestuffs or compounds containing substituents capable of dyestuff formation and possessing at least one allyl group, upon which the reaction products, when they contain radicals of organic compounds with substituents capable of dyestuff formation, are converted into dyestuffs by a suitable reaction.

A special mode of operation of the process consists in reacting with 2.3-dihalogenopropylamine or 1.2.3-trihalogenopropane, organic dyestuffs or compounds containing a substituent which is capable of dyestuff formation and possesses at least one acid halide or acid amide group, whereupon the reaction products, when they contain radicals of organic compounds with substituents capable of dyestuff formation, are converted into dyestuffs by a suitable reaction.

The new process is applicable with all classes to dyestuffs, viz.: monoazo and polyazo dyestuffs which may contain metallizable groupings or metal atoms in complex combination, e.g., chromium, cobalt, nickel or copper atoms, anthraquinone dyestuffs, phthalocyanine dyestuffs, nitro dyestuffs etc.

The azo dyestuffs containing metallizable groupings can be metallized after condensation or, alternatively, they can ze reacted with the fiber in the metal-free form and the dyeings aftertreated with a metal-yielding agent.

The 2.3-dihalogenopropyl group can be connected to the dyestuff molecule either directly or through a bridge member. Suitable bridge members are, e.g., —O—, —S—, —NH—, —CO—, —NH—CO—, but —CO—NH— or —SO$_2$—NH— is preferable; in which case —NH— is linked to the 2.3-dihalogenopropyl group.

In accordance with the definition it is possible to arrive at dyestuffs containing at least one 2.3-dihalogenopropyl group by starting from compounds containing at least one allyl group and a substituent which is capable of dyestuff formation either directly or after a suitable reaction. The azo coupling has an important bearing on the reaction giving the final dyestuffs. It can be effected by treating compounds containing at least one allyl group and a nitro or readily saponifiable acylamino group with halogen (chlorine, bromine) or a halogen-yielding agent (benzene- or 4-methylbenzene-1-sulfonic acid dichloramide, chloro- or bromosuccinimide), reducing the nitro group or saponifying the acylamino group, diazotizing the intermediate product and coupling the diazo compound with a coupling compound to give the dyestuff.

Again, compounds which have at least one allyl group and a carbon atom capable of coupling can be reacted with halogen or halogen-yielding agents to give an intermediate product for use as coupling compound. The halogenation is carried out advantageously in an organic medium ($CS_2$, $CHCl_3$, $CCl_4$ tetrachlorethane, benzene, toluene, chlorobenzene, glacial acetic acid and at low temperatures, e.g., between 0 and 30° C. It follows that the diazo compound of a diazo component containing a 2.3-dihalogenopropyl radical can also be coupled with a coupling component which likewise contains a 2.3-dihalogenopropyl radical.

The dyestuffs employed in the special mode of operation of the process as described above can be selected from any class of dyestuffs. They must contain at least one acid halide or acid amide group, e.g., a sulfonic acid halide or carboxylic acid halide group, preferably a sulfonic acid chloride or carboxylic acid chloride group, or a sulfonic acid amide or carboxylic acid amide group. The reaction of the acid halide group with 2.3-dihalogenopropylamine, e.g., 2.3-dichloro- or 2.3-dibromopropylamine, is conducted in aqueous, aqueous-organic or organic medium and preferably in presence of acid-binding agents and at low temperatures, e.g., between 0° and 70° C. The reaction of the acid amide group with 1.2.3-trihalogenopropane, e.g., 1.2.3-trichloro-, 1.2.3-tribromo- or 1-bromo- or 1-iodo-2.3-dichloropropane, can also be carried out in aqueous medium. As the 1.2.3-trihalogenopropanes are insoluble in water it is, however, advantageous to work in aqueous-organic or in organic medium and preferably in presence of acid-binding agents. The temperature can be varied within wide limits to suit the reactivity of the 1.2.3-trihalogenopropane, e.g., from 0° to 150° C., and pressure can be applied if necessary. The addition of wetting, emulsifying or dispersing agents can accelerate the rate of reaction.

The intermediate products, which contain substituents capable of dyestuff formation directly or after suitable conversion and in addition an acid halide or acid amide group, can also be reacted with 2.3-dihalogenopropylamine or 1.2.3-trihalogenopropane. The dyestuff is then formed from the reaction product immediately or after it has been converted, e.g., the nitro group reduced to an amino group when a diazo component is involved, in which case it is important to ensure that the trihalogenopropyl group is not damaged during the formation of the dyestuff.

On completion of condensation or coupling the solution or suspension is neutralized if desired, and the reactive dyestuff is salted out with sodium or potassium chloride or precipitated with acid. It is subsequently filtered with suction, washed and dried.

The water-soluble reactive dyestuffs of the invention which contain at least one 2.3-dihalogenopropyl radical, are suitable for the dyeing, padding and printing of fibers of vegetable and animal origin, fibers of regenerated cellulose, casein fibers, animalized cellulosic fibers, synthetic polyamide fibers, mixtures of these fibers, and leather. If necessary the dyeings and prints are subjected to an alkaline after treatment at high temperatures and then soaped. They possess good fastness to light, washing, milling and perspiration.

The water-soluble reactive dyestuffs of the invention reserve acetate, triacetate, polyethylene terephthalate, polyvinyl chloride and polyacrylonitrile fibers.

The water-insoluble reactive dyestuffs of the invention are suitable for dyeing secondary cellulose acetate, cellulose triacetate and polyethylene terephthalate fibers and especially synthetic polyamide fibers in dyeings fast to wet treatments.

In the following examples the parts and percentages are by weight and the temperatures in degrees centigrade.

*Example 1*

In a mixing vessel equipped with a thermometer, reflux condenser and charging funnels, 100 parts of 3-nitrobenzene-1-sulfonic acid amide are suspended in 140 parts of water and 160 parts of ethyl alcohol with the addition of 20 parts of sodium hydroxide, which brings about partial dissolving. 65 parts of allyl bromide are added and the mixture heated for 23 hours with reflux. On cooling, it is adjusted to pH 7 and the gray-yellow, crumbly mass filtered off. On recrystallization from carbon tetrachloride, the product is obtained in the form of white needles with a melting point at 75–78°.

40 parts of the aforementioned product are dissolved in 300 parts of carbon disulfide and chlorinated at 5° with dry chlorine gas until the green-yellow colour in the vessel indicates that the reaction is completed. The product is recrystallized form 30% alcohol. Its melting point is 95–98°, its chlorine content 22.3% (found), 22.7% (calculated).

The next step, reduction, is begun by suspending 25 parts of iron powder in 160 parts of ethyl alcohol and etching the metal in 10 minutes at 45–50° with 2.5 parts of glacial acetic acid. Immediately afterwards, 30 parts of 3-nitrobenzene-1-sulfonic acid-(2'.3'-dichloro)-propylamide are added and the nitro group reduced by boiling for 16 hours with reflux. On cooling to room temperature the excess iron powder is filtered off and the red-brown reaction mixture diluted with 500 parts of water. A non-diazotizable substance is separated by acidification with 100 parts of concentrated hydrochloric acid. After filtration the amine can be isolated as a hydrochloride by evaporation of the filtrate. On recrystallization the pure hydrochloride is obtained. M.P. 203–206° (decomposition), chlorine content 33.2% (calculated), 32.1% (found).

An amount of the chlorohydrate equivalent to 11.3 parts of 3-aminobenzene-1-sulfonic acid-(2'.3'-dichloro)-propylamide is stirred into 40 parts of water and 10 parts of 30% hydrochloric acid and diazotized by the addition of a solution of 2.8 parts of sodium nitrite in 10 parts of water at 0–3°. After about 10 minutes the excess nitrite is destroyed with amidosulfonic acid and this solution is run into a neutral solution at 3–5° of 13.2 parts of 1-(2'.5'-dichloro)-phenyl-3-methyl-5-pyrazolone-4'-sulfonic acid in 200 parts of water. The pH is adjusted to 4–4.5, e.g., with sodium acetate solution, upon which coupling takes place immediately to give a yellow dyestuff which is precipitated in quantitative yield. After 4 hours' stirring at 0–5° the product is filtered off and dried at 60°. It is a yellow powder which dissolves in water with a yellow coloration and dyes wool, silk, synthetic polyamide fibers and cellulosic fibers in yellow shades which are fast to light, washing, milling and perspiration.

A suitable dyeing method is as follows: A dyebath is set with 5000 parts of water and 4 parts of the above-described dyestuff and the pH value adjusted to 6. 100 parts of wetted wool are entered and dyed for 1½ hours at 90–100°, then 15% sodium hydroxide solution is added to bring the pH to 8.7 and dyeing continued for 30 minutes at 80–90°. The dyeing obtained is removed, washed with water with a little acetic acid in one of the washing baths, and dried.

Example 2

14 parts of 3-aminobenzene-1-sulfonic acid-(2'.3'-dichloro)-propylamide are stirred ito 18.5 parts of 30% hydrochloric acid and 50 parts of water. At 0–3° 14.5 parts of 4 n. sodium nitrite solution are added and the solution stirred for a short time at 0–5°. A second solution is prepared with 13.5 parts of 1-hydroxy-naphthalene-3.6-disulfonic acid in 250 parts of water with the addition of sodium carbonate, which after cooling to 3–5° is adjusted to pH 4–4.5 with glacial acetic acid and mixed with the diazo solution. The pH value of the coupling mixture is maintained at 4–4.5 with sodium acetate. On completion of coupling the orange-red dyestuff is salted out, filtered with suction, again dissolved 750 parts of water and reprecipitated, and dried.

On cotton the dyestuff gives dyeings fast to light, washing, water and perspiration.

Example 3

14 parts of 3-aminobenzene-1-sulfonic acid-(2'.3'-dichloro)-propylamide are diazotized according to the procedure described in Example 2. 11.2 parts of 1-hydroxy-naphthalene-4-sulfonic acid are dissolved in 250 parts of water with the addition of sodium carbonate and the solution adjusted to pH 4–4.5 with glacial acetic acid. At about 3–5° this solution is mixed with the diazo solution, upon which the dyestuff is precipitated. It is dissolved in 750 parts of water, reprecipitated and dried at 60°.

A mercerized cotton fabric is padded with a 3% neutral solution of the above dyestuff at 50° and an expression (pick-up) of about 85%. After drying, the padding is fixed by treatment for about 1 hour with constant agitation in a developing bath at 80–90° set with 250 parts of calcined sodium sulfate, 15 parts of trisodium phosphate and 3 parts of sodium 3-nitrobenzene-1-sulfonate per 1000 parts of the solution. The liquor ratio of this bath may vary from 1:10 to 1:50. Fixation is followed by thorough rinsing in cold water, soaping at the boil, rinsing and drying. The orange-red dyeing obtained is fast to light, water, washing, perspiration, soda boiling, rubbing, and dry cleaning.

Example 4

200 parts of water and 29 parts of allylamine are entered in a glass beaker equiped with a stirrer, thermometer, dropping funnel and pH measuring attachment. At an initial pH value of 10.3 100 parts of 3-methyl-4-nitrobenzene-1-carboxylic acid chloride are dropped in. Soon the pH begins to fall and solid sodium carbonate is added slowly to maintain it at 7–8, the rate of addition being controlled so that the temperature does not rise above 20–28°. A light yellow, crumbly mass is formed which on completion of the reaction is filtered off. It is well soluble in alcohol, chlorobenzene and trichloroethylene. Recrystallized from alcohol with the addition of active carbon, it melts at 86–88°.

40 parts of the above-described carboxylic acid amide are suspended in 300 parts of carbon disulfide, upon which it goes into partial solution. On cooling to 5° it is chlorinated with dry chlorine gas until the green-yellow color in the vessel indicates that the reaction is completed. The carbon disulfide is decanted from the tough, highly viscous substance, and the product, freed from solvent, is recrystallized from water. Its melting point is 114–116°, and the chlorine content is 24.2% (calculated) and 22.4% (found).

Reduction is initiated by suspending 25 parts of iron powder in 160 parts of alcohol and etching the metal at 45–50° in 10 minutes with 2.5 parts of glacial acetic acid, following which 30 parts of 3-methyl-4-nitrobenzene-1-carboxylic acid-(2'.3'-dichloro)-propylamide are added and the nitro group reduced by heating for 16 hours at 75–80°. On cooling the excess iron powder is filtered off and the filtrate, with an addition of 100 parts of concentrated hydrochloric acid, is evaporated in vacuo. In this way the hydrochloride of the amide is obtained as a light yellow powder.

11.5 parts of 3-methyl-4-aminobenzene-1-carboxylic acid-(2'.3'-dichloro)-propylamide are stirred into 40 parts of water and 15.5 parts of 30% hydrochloric acid. At 0–3% 13 parts of 4 n. sodium nitrite solution are added. On diazotization the excess sodium nitrite is destroyed with amidosulfonic acid and the diazo solution at 3–5° is run into a solution of 16.5 parts of 1-(2'.5'-dichloro)-phenyl-3-methyl-5-pyrazolone-4'-sulfonic acid in 200 parts of water, the pH value being adjusted to 4–4.5 with sodium carbonate. Coupling takes place immediately to give a yellow dyestuff which is precipitated in quantitative yield. After stirring for 4 hours at 0–3° the product is filtered off and dried at 60°. It is a yellow powder which dyes wool, silk, synthetic polyamide fibers and cellulosic fibers from aqueous solution in yellow shades.

A cotton fabric is printed with a paste of the following composition:

30 parts of the dyestuff of this example,
100 parts of urea,
450 parts of 3.5% sodium alginate thickening,
10 parts of sodium 3-nitrobenzene-1-sulfonate,
15 parts of sodium carbonate,
395 parts of water
————
1000 parts The print is dried, steamed for 10 minutes at 102–104°, rinsed with cold and warm water, soaped at 100° with a 0.2% soap solution, rinsed again and dried. It is of yellow shade and possesses high fastness to light, water, washing, perspiration, rubbing and dry cleaning.

Details of further reactive dyestuffs are set forth in the following table. They are obtainable by the procedures described in Examples 1 to 4 and are characterized by the symbols X, Y, Z, V and Hal in the diazo component of the formula

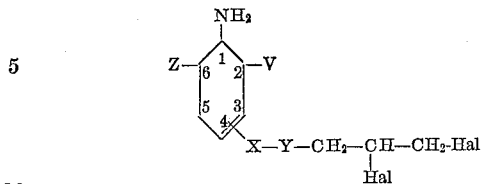

(columns (I), (II), (III), (IV) and (V)), by the position of the

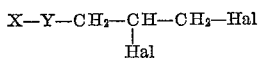

group (column (VI)), by the coupling component (column (VII)) and by the shade of the dyeings on wool for the water-soluble dyestuffs or on synthetic polyamide fibers for the water-insoluble dyestuffs (column (VIII)).

| Example No. | (I) X | (II) Y | (III) V | (IV) Z | (V) Hal | (VI) Position | (VII) Coupling component | (VIII) Shade of the Dyeing |
|---|---|---|---|---|---|---|---|---|
| 5 | —SO₂— | —NH— | H | H | Cl | 3 | 1-phenyl-3-methyl-5-pyrazolone | yellow. |
| 6 | —SO₂— | —NH— | H | H | Cl | 4 | hydroxybenzene | brownish yellow. |
| 7 | —CO— | —NH— | H | H | Cl | 4 | 2-hydroxynaphthalene-8-sulfonic acid | reddish orange. |
| 8 | —CO— | —NH— | H | H | Cl | 4 | 2 - amino - 5 - hydroxynaphthalene - 7 - sulfonic acid. | brown red. |
| 9 | —SO₂— | —NH— | H | H | Cl | 4 | 2-hydroxybenzene-1-carboxylic acid | yellow. |
| 10 | —SO₂— | —NH— | H | H | Cl | 3 | 2 - hydroxynaphthalene - 6.8 - disulfonic acid. | reddish orange. |
| 11 | —SO₂— | —NH— | H | H | Cl | 3 | 2-hydroxynaphthalene-6-sulfonic acid | Do. |
| 12 | —SO₂— | —NH— | H | H | Cl | 4 | 2-hydroxynaphthalene-sulfonic acid | Do. |
| 13 | —SO₂— | —NH— | H | H | Br | 3 | 1-aminonaphthalene-4-sulfonic acid | orange. |
| 14 | —SO₂— | —NH— | H | H | Br | 3 | 2-hydroxynaphthalene-4-sulfonic acid | bluish red. |
| 15 | —SO₂— | —NH— | H | H | Cl | 3 | 1 - acetylamino - 8 - hydroxynaphthalene-3.6-disulfonic acid. | Do. |
| 16 | —CO— | —NH— | H | H | Cl | 4 | 1.3-dihydroxybenzene | yellow. |
| 17 | —CO— | —N(CH₃)— | H | H | Cl | 4 | 2 - benzoylamino - 8 - hydroxynaphthalene-3.6-disulfonic acid. | bluish red. |
| 18 | —SO₂— | —N(CH₃)— | H | H | Cl | 4 | 4 - amino - 1 - hydroxybenzene - 2 - carboxylic acid. | brown. |
| 19 | —SO₂— | —NH— | H | H | Cl | 4 | 2-amino-8-hydroxynaphthalene-6-sulfonic acid. | bluish red. |
| 20 | —SO₂— | —NH— | H | H | Cl | 4 | 2-hydroxynaphthalene-7-sulfonic acid | orange. |
| 21 | —SO₂— | —NH— | H | H | Br | 3 | 1.3-diaminobenzene-6-sulfonic acid | yellow-brown. |
| 22 | —SO₂— | —NH— | H | H | Br | 4 | 1-phenylaminonaphthalene-8-sulfonic acid. | red. |
| 23 | —CO— | —NH— | H | H | Br | 4 | 1-hydroxynaphthalene-4.8-disulfonic acid. | bluish red. |
| 24 | —SO₂— | —NH— | H | H | Cl | 3 | 1-hydroxynaphthalene-3.6-disulfonic acid. | orange-red. |
| 25 | —SO₂— | —NH— | H | H | Cl | 3 | 1-hydroxynaphthalene-4-sulfonic acid. | red-orange. |
| 26 | —SO₂— | —NH— | H | H | Cl | 3 | 1-(3'-chloro)-phenyl-3-methyl-5-pyrazolone. | yellow. |
| 27 | —SO₂— | —NH— | H | H | Cl | 4 | 1-hydroxynaphthalene-3.6.8-trisulfonic acid. | red. |
| 28 | —SO₂— | —NH— | H | H | Cl | 3 | 2.4-diamino-1-methylbenzene | brown-yellow. |
| 29 | —SO₂— | —NH— | H | H | Cl | 3 | 1-dimethylamino-sulfonylamino-7-hydroxynaphthalene. | red. |
| 30 | —SO₂— | —NH— | H | H | Cl | 3 | 2-hydroxynaphthalene-3.6-disulfonic acid. | orange-red. |
| 31 | —SO₂— | —NH— | H | H | Cl | 4 | 1-aminonaphthalin-5-sulfonic acid | orange. |
| 32 | —CO— | —NH— | H | CH₃ | Cl | 4 | 1-phenyl-3-methyl-5-pyrazolone-2'.5'-disulfonic acid. | yellow. |
| 33 | —SO₂— | —NH— | H | SO₃H | Cl | 4 | 1-(2'.5'-dichloro)-phenyl-3-methyl-5-pyrazolone-4'-sulfonic acid. | greenish yellow. |
| 34 | —CO— | —NH— | H | CH₃ | Cl | 4 | 1-benzoylamino-8-hydroxy-naphthalene-3.6-disulfonic acid. | bluish red. |
| 35 | —CO— | —NH— | H | CH₃ | Cl | 4 | 1-benzoylamino-8-hydroxy-naphthalene-4.6-disulfonic acid. | red. |
| 36 | —CO— | —NH— | H | CH₃ | Cl | 4 | 1-benzoylamino-8-hydroxy-naphthalene-3.5-disulfonic acid. | Do. |
| 37 | —SO₂— | —NH— | H | OH | Cl | 4 | 1-acetylamino-8-hydroxy-naphthalene-3.5-disulfonic acid: Cu-Complex. | navy blue. |
| 38 | —SO₂— | —NH— | NO₂ | OH | Cl | 4 | 1-acetylamino-8-hydroxy-naphthalene-3.6-disulfonic acid: Cr-Complex. | bluish gray. |
| 39 | —SO₂— | —NH— | NO₂ | OH | Cl | 4 | 1-acetylamino-8-hydroxy-naphthalene-3.6-disulfonic acid: Co-Complex. | reddish gray. |
| 40 | —CO— | —NH— | H | CH₃ | Cl | 4 | 1-hydroxynaphthalene-4-sulfonic acid. | red. |
| 41 | —SO₂— | —NH— | H | H | Cl | 3 | 1-(2'.5'-dichloro)-phenyl-3-methyl-5-pyrazolone-4'-sulfonic acid. | yellow. |
| 42 | —SO₂— | | H | H | Cl | 3 | 1-phenyl-3-methyl-5-pyrazolone-2'.5'-disulfonic acid. | Do. |

Further the dyestuffs of the formulae:

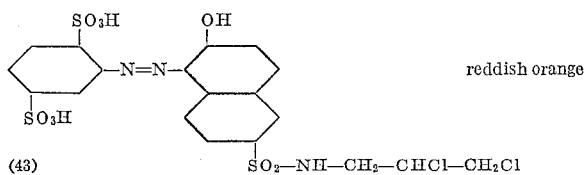
(43) reddish orange

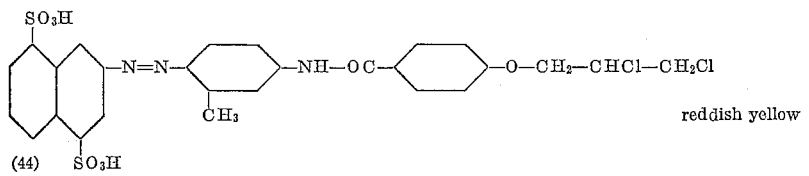
(44) reddish yellow

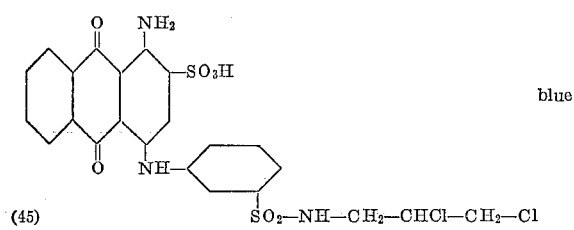
(45) blue

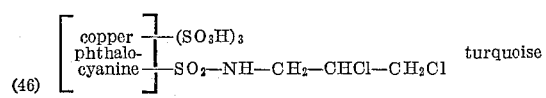
(46) turquoise

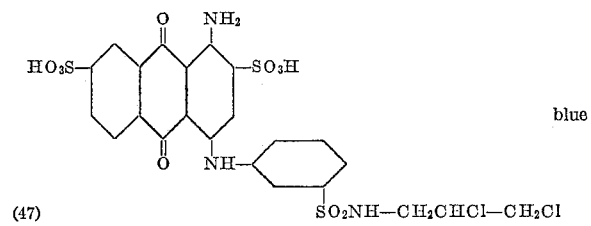
(47) blue

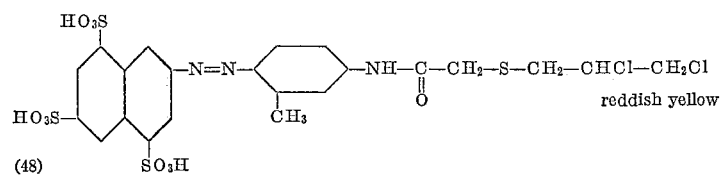
(48) reddish yellow

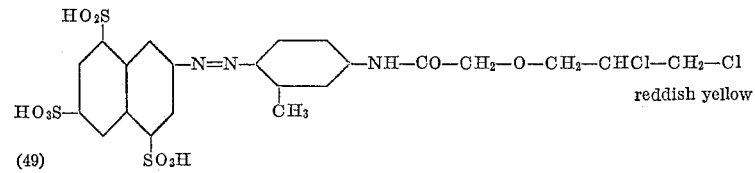
(49) reddish yellow

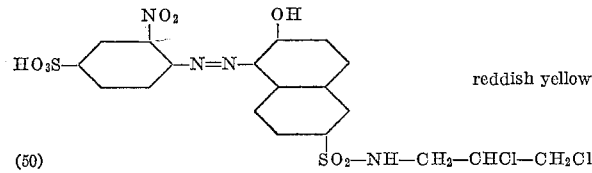
(50) reddish yellow

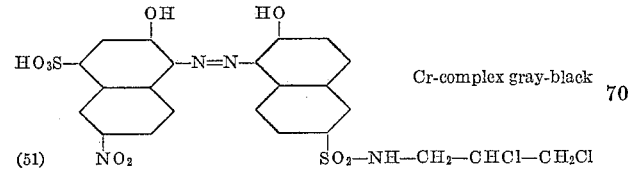
(51) Cr-complex gray-black

*Dying Example 52*

A mixture of 35 parts of the dyestuff 2-hydroxy-5- methyl-1.1′-azobenzene-3′-sulfonic acid-(2″.3″-dichloro)-propylamide, 20 parts of sodium dinaphthylmethanedisulfonate, 10 parts of sodium cetylsulfate and 35 parts of anhydrous sodium sulfate is ground in a roller mill for 48 hours. 1 part of the resulting dyestuff preparation is carefully pasted with cold distilled water and dispersed by adding further water. The dispersion is run into a solution of 2 parts of a sulfonated castor oil with a degree of sulfonation of 80% and 2.5 parts of 100% acetic acid in 3500 parts of water, the volume then being made up to 4000 parts. 100 parts of well scoured nylon 66 fabric are entered into the dyebath, the temperature increased to the boil in about 30 minutes and maintained at 95–100° for 30 minutes. The dyed material is then removed, treated for 1 hour at 100° in a bath of 4000 parts of water and 10 parts of sodium carbonate, and subsequently soaped in a solution of 1.5 parts of octylphenyloctaglycol ether in 4000 parts of water for 20 minutes at 70°, rinsed and dried. A yellow dyeing fast to light, washing, water, perspiration, rubbing and sublimation is obtained.

Formulae of representative dyestuffs of the foregoing examples are:

Example 1:

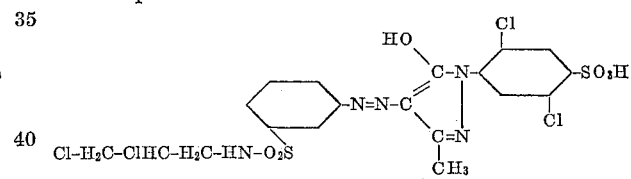

Example 2:

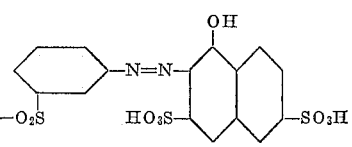

Example 3:

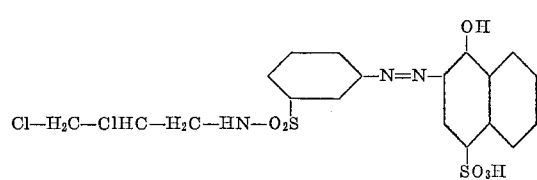

Example 4:

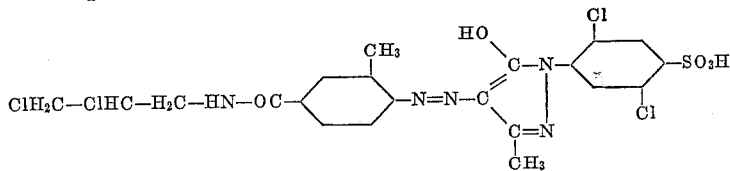

Example 32:

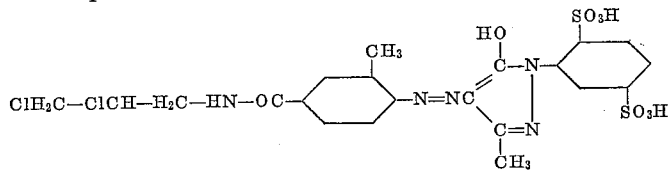

Example 34:

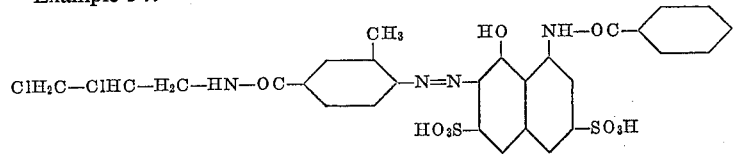

Example 35:

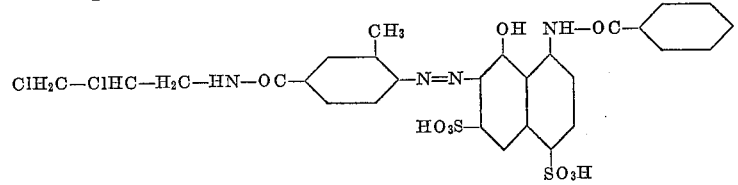

Example 36:

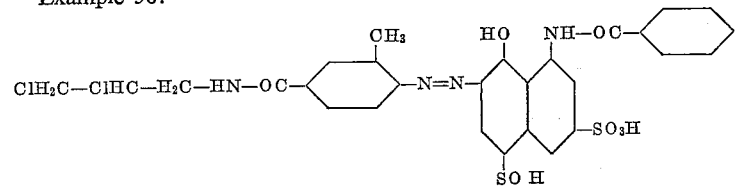

Example 37: Copper complex compound of—

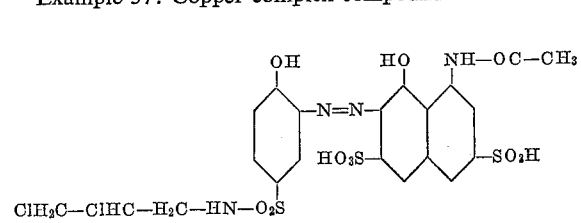

Example 38: Chromium complex compound of—

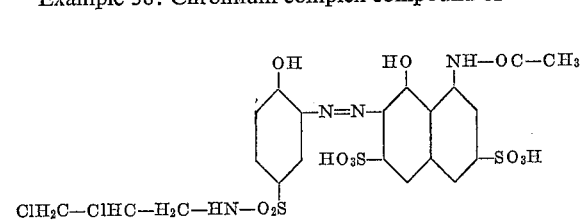

Example 39: Cobalt complex compound of

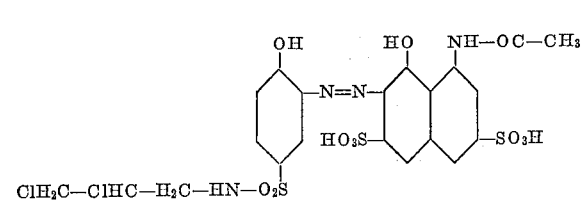

Example 45:

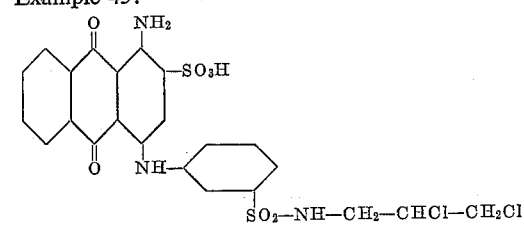

Example 46:

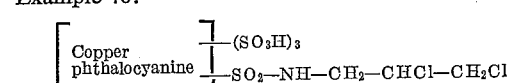

Having thus disclosed the invention what we claim is:
1. Water-soluble reactive dyestuff consisting essentially of
   (1) a dyestuff grouping selected from the class consisting of
      (a) unmetallized monoazo dyestuff grouping selected from the class consisting of
         (i) benzene-azo-benzene groupings,
         (ii) benzene-azo-naphthalene groupings,
         (iii) benzene-azo-5-pyrazolone groupings, and
         (iv) naphthalene-azo-naphthalene groupings;
      (b) chromium, copper, cobalt and nickel complexes of (a);
      (c) 1-amino-2-sulfo-4-phenylamino-anthraquinone groupings;
      and (d) copper phthalocyanine sulfonic acid groupings;

(2) as sole reactive grouping, a

—CH$_2$—CH—CH$_2$-Hal
   |
   Hal grouping, wherein Hal has an atomic number from 17 to 35 inclusive; and (3) a divalent bridge grouping connected by one of its valences to a nuclear carbon atom of the dyestuff grouping (1) and by its other valence to the terminal —CH$_2$ of the reactive grouping (2), said bridge grouping being selected from the class consisting of
—SO$_2$NH—, —CONH—, —CON(CH$_3$)—,
—SO$_2$N(CH$_3$),

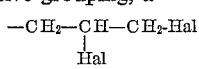

—NHCO—CH$_2$—S— and —NHCO—CH$_2$—O—

2. The reactive dyestuff of the formula

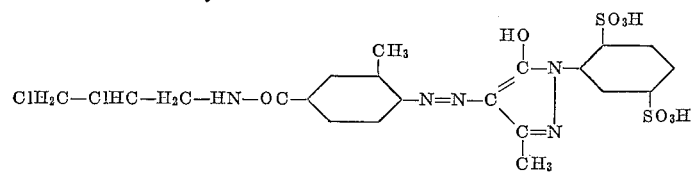

3. The reactive dyestuff of the formula

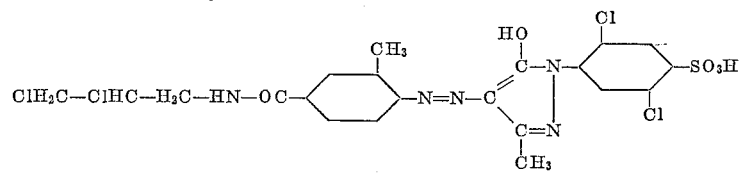

4. The reactive dyestuff of the formula

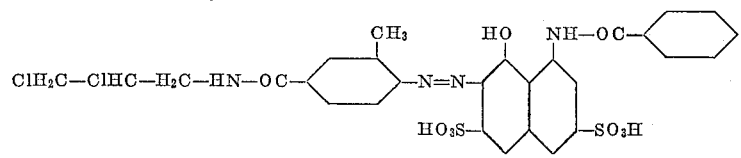

5. The reactive dyestuff of the formula

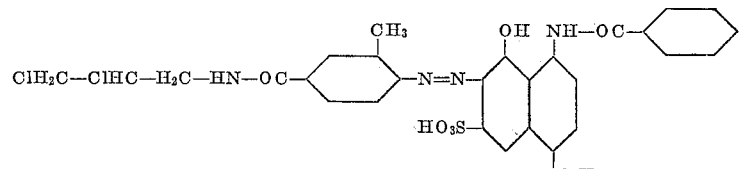

6. The reactive dyestuff of the formula

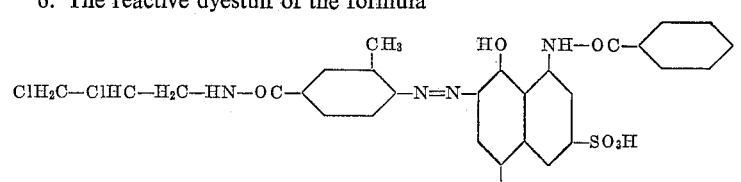

7. The reactive dyestuff of the formula

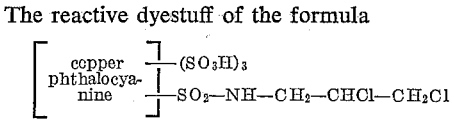

8. The reactive dyestuff of the formula

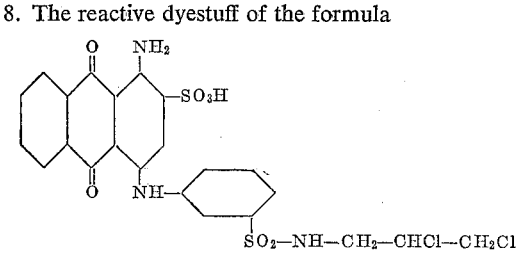

9. The copper complex compound of the reactive dyestuff of the formula

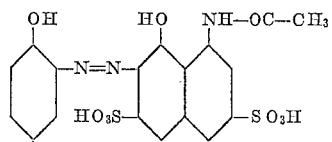

10. The chromium complex compound of the reactive dyestuff of the formula

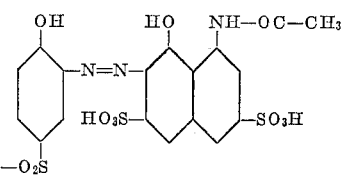

11. The cobalt complex compound of the reactive dyestuff of the formula

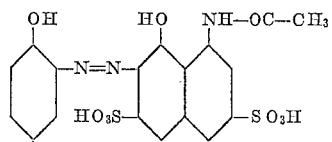

References Cited in the file of this patent
UNITED STATES PATENTS

| | | |
|---|---|---|
| 2,128,255 | Krzikalla et al. | Aug. 30, 1938 |
| 2,743,267 | Heyna et al. | Apr. 24, 1956 |
| 2,766,231 | Bolliger | Oct. 9, 1956 |
| 2,824,864 | Buehler | Feb. 25, 1958 |

UNITED STATES PATENT OFFICE
CERTIFICATE OF CORRECTION

Patent No. 3,123,595            March 3, 1964

Hugo Brugger et al.

It is hereby certified that error appears in the above numbered patent requiring correction and that the said Letters Patent should read as corrected below.

Column 1, line 37, for "ze" read -- be --; line 68, after "acid" insert a closing parenthesis; columns 5 and 6, Example 31, under column VII, for "aminonaphthalin" read -- aminonaphthalene --; column 6, lines 3 to 10, the left-hand portion of the formula should appear as shown below instead of as in the patent:

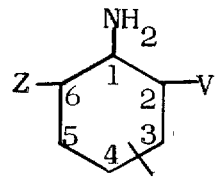

column 7, line 1, for "Futher" read -- Further --; line 74, for "Dying" read -- Dyeing --; column 9, Example 36, for that portion of the formula reading:

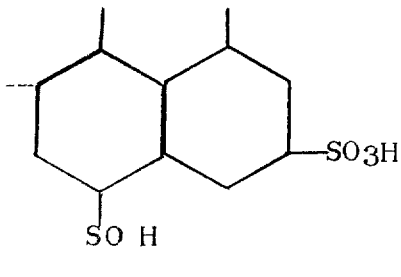     read     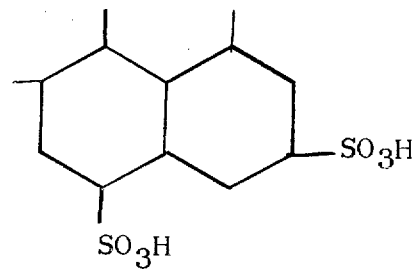

Signed and sealed this 10th day of November 1964.

(SEAL)
Attest:

ERNEST W. SWIDER            EDWARD J. BRENNER
Attesting Officer            Commissioner of Patents